Patented May 8, 1945

2,375,396

UNITED STATES PATENT OFFICE 2,375,396

METHOD OF TREATING PLASTIC
SHEETING

George B. Watkins, Toledo, Ohio, assignor to Libbey-Owens-Ford Glass Company, Toledo, Ohio, a corporation of Ohio No Drawing. Application February 25, 1942,
Serial No. 432,303

1 Claim. (Cl. 117—139)

My invention relates broadly to the treatment of plastic sheeting to facilitate handling thereof and more particularly to an improved method of treating relatively soft, flexible sheets of plastic such as are used in the manufacture of laminated safety glass.

At the present time, it is customary in manufacturing laminated safety glass to use as the plastic interlayer a sheet of synthetic resin, such as, for example, a polyvinyl acetal resin. For instance, one such resin which has been satisfactorily used is polyvinyl butyr acetal resin plasticized with either dibutyl sebacate or triethylene glycol hexoate.

The plastic is ordinarily received by the safety glass manufacturer in relatively large rolls and is subsequently conditioned, cut into sheets of the desired size, and then washed before being assembled with the glass sheets. With the adoption of softer preformed plastic interlayers, such as the polyvinyl acetal resins, considerable difficulties have been introduced into the laminating operations, especially as regards handling of the plastic from the time it is received until it is finally composited between the glass sheets.

One major difficulty in handling these plastics arises from the fact that the plastics are usually so plasticized that they are relatively soft and tacky and, when rolled for shipment or stacked in storage, the contacting plastic tends to coalesce. In attempting to separate plastic sheets one from another, tension is applied to the plastic and, due to the resiliency thereof, permanent distortion is introduced into the sheets resulting in poor gauge.

To overcome the above difficulties in handling, the plastic manufacturers have adopted two procedures. Thus, subsequent to the formation of the plastic sheeting, the manufacturer roughens or embosses the plastic. This step in itself is insufficient to prevent sticking even though it enables better handling so that the second step employed by the plastic manufacturer is to coat the plastic with a salt or other water-soluble material. At the present time, sodium bicarbonate is employed for dusting the plastic sheeting, and the rolls of plastic, as received by the safety glass manufacturer, have a fairly uniform coating of this salt on both surfaces of the plastic.

In the manufacturing operations of the company to which this application is assigned, the plastic, as received in roll form coated with salt, is dried at an elevated temperature to reduce the moisture content to substantially less than 0.5%; i. e., about 0.2%. The dried plastic is then cut to pattern size and stored with the salt coating thereon until ready for use. Just prior to laminating with the glass sheets, the plastic is washed to remove the salt coating therefrom. Due to the fact that the moisture content of the plastic at the time of lamination must be not more than 0.5% to 0.6%, the washing operation is a delicate one and must be accurately controlled. The rapid tendency of the plastic sheet to absorb moisture limits the amount of time that water can contact the sheet thereby hindering thorough cleansing of the surfaces thereof. When the moisture content of the plastic exceeds 0.5% to 0.6% unstable laminations will result. Also, the presence of too much moisture in the resin plastic at the time of lamination materially detracts from the adhesion of the glass-plastic layers.

In the washing operation, the salt-coated sheet of plastic is usually carried forwardly upon a continuous conveyor between spray nozzles which flood the surfaces of the plastic with water which dissolves the salt from said surfaces. After solution of the salt, the plastic is given a water rinse, squeegeed, and all the surface moisture on the plastic removed by drying with conditioned air at a slightly elevated temperature. These operations all take place in a very short time interval, thereby insuring that the plastic does not pick up too much moisture in the washing operation.

After being washed, the plastic sheet is ordinarily substantially free of salt and has a translucent appearance due to the roughness of the surface. However, it is difficult, because of this surface roughness, to inspect the plastic and ascertain whether or not the salt has been completely removed. As a result, a substantial amount of the plastic, which is then laminated with the glass sheets, has on its surface small quantities of salt which lead to rejects in the finished laminated glass. It has been found that if every last trace of salt is not removed from the plastic, the fine crystals of salt show up in the laminated product as haze or smear, causing rejection of the lamination. It may also be pointed out that the presence of the salt particles remaining upon the plastic after washing defy inspection and, consequently, rejects of this type on a large scale production cut down the efficiency of operation and lead to considerable losses.

Further, in the process of dusting the plastic with powdered salt, in some cases the salt becomes slightly embedded in the surfaces of the plastic or particles of salt become entrapped or lodged in the embossing on said surfaces. To remove this salt by washing with water within the limited time permitted for the washing operation has been found to be almost impossible, and continued washing leads to an excessive moisture pick-up by the plastic itself. As pointed out above, the presence of excessive moisture in the plastic has deleterious effects on the stability of the finished lamination towards heat, as well as causing a break-down of the bond between the plastic and glass leading to edge let-goes.

It is the aim of my invention to avoid the above difficulties by using in lieu of the sodium bicarbonate a material for coating the plastic which is more readily soluble in water, especially water at low temperatures, than the sodium bicarbonate. More particularly, I propose the substitution of powdered sugar (sucrose) for the sodium bicarbonate. I have found that ordinary sugar is more readily soluble in water than sodium bicarbonate and that, due to the more rapid solution and greater solubility of the sugar in water at the temperatures employed for washing the plastic, it is possible to materially reduce rejects due to salt smear in the finished laminations. Tests which I have made show that the solubilities of sugar and sodium bicarbonate are radically different at the temperatures used in washing the plastic. For example, there is tabulated below the solubilities of sodium bicarbonate and sugar at 40° F. and 105° F.:

|  | Solubility in grams per hundred grams of water at— | |
| --- | --- | --- |
|  | 40° F. | 105° F. |
| Sugar | 184 | 239 |
| Sodium bicarbonate | 7.45 | 12.8 |

I have given the solubilities of the sugar and sodium bicarbonate at these two temperatures because they are the extreme temperatures ordinarily employed in washing the plastic material in the manufacturing process of the assignee company.

I have found that, due to the greater solubility of the sugar, a coating thereof on the plastic can be completely washed therefrom within the time allowed for the washing operation. In addition to being more readily washed from the plastic, I have discovered that sugar (sucrose) is soluble in the plasticizer used in the plastic sheeting. Thus, the sugar being of an organic material is soluble in the plasticizer which is likewise organic in nature.

Therefore, in addition to being water-soluble, the powdered sugar is also soluble in the plasticizer used in the plastic sheeting and will therefore dissolve in the plastic sheet during the laminating operation without producing haze. In other words, while the sugar coating will ordinarily be completely off of the plastic sheeting, there may be times when particles of the sugar will become embedded in the plastic or lodged in the roughened surface thereof and thus not removed in the washing operation. However, these particles of sugar remaining on the plastic will not prove objectional, since they will be dissolved during the laminating process and thus not show up as defects in the finished lamination.

Although the invention is definitely not limited to the coating of any particular plastic or plastics, the following plastic compositions are given by way of example:

I. One hundred parts polyvinyl butyr acetal resin.
Forty-five parts dibutyl sebacate.
II. One hundred parts polyvinyl butyr acetal resin.
Forty-five parts triethylene glycol hexoate.

A typical analysis of the polyvinyl butyr acetal resin is:

Per cent
Vinyl alcohol calculated as polyvinyl alcohol _____ 18 to 20
Vinyl acetate calculated as polyvinyl acetate _____ 0 to 1
Vinyl butyr acetal calculated as polyvinyl acetal _____ 69 to 72

Powdered sugar may be used for coating plastic sheeting formed of either of the above compositions and is soluble in the plasticizer used, i. e., dibutyl sebacate and triethylene glycol hexoate. For instance, I found that sugar (sucrose) is soluble in the dibutyl sebacate to the extent of 0.6 of 1% at the laminating temperatures (300° F. to 320° F.).

A further advantage in the use of powdered sugar is that the density of sugar, which is 1.58 at 70° F., is substantially less than that of sodium bicarbonate, i. e., 2.2 at the same temperature. This means that assuming the same bulking characteristics of the two materials, one pound of sugar will cover approximately 39% more plastic surface than one pound of sodium bicarbonate.

I claim:

The method of treating plastic sheeting to be used in the manufacture of laminated safety glass, and that is formed of a polyvinyl acetal resin plasticized with dibutyl sebacate, to facilitate handling thereof, comprising applying a temporary coating of powdered sugar to said plastic sheeting.

GEORGE B. WATKINS.